(12) United States Patent
Henkel et al.

(10) Patent No.: US 10,693,324 B2
(45) Date of Patent: Jun. 23, 2020

(54) MONITORING DEVICE FOR MONITORING AN INDUCTIVE ENERGY TRANSMISSION DEVICE

(71) Applicant: Robert Bosch GmbH, Stuttgart (DE)

(72) Inventors: Achim Henkel, Stuttgart (DE); Ulrich Brenner, Moeglingen (DE)

(73) Assignee: Robert Bosch GmbH, Stuttgart (DE)

(*) Notice: Subject to any disclaimer, the term of this patent is extended or adjusted under 35 U.S.C. 154(b) by 49 days.

(21) Appl. No.: 15/781,340

(22) PCT Filed: Nov. 2, 2016

(86) PCT No.: PCT/EP2016/076381
§ 371 (c)(1),
(2) Date: Jun. 4, 2018

(87) PCT Pub. No.: WO2017/092949
PCT Pub. Date: Jun. 8, 2017

(65) Prior Publication Data
US 2018/0366985 A1 Dec. 20, 2018

(30) Foreign Application Priority Data

Dec. 2, 2015 (DE) .......... 10 2015 224 016

(51) Int. Cl.
*H02J 50/12* (2016.01)
*H02J 50/40* (2016.01)
(Continued)

(52) U.S. Cl.
CPC .............. *H02J 50/12* (2016.02); *B60L 53/12* (2019.02); *B60L 53/124* (2019.02);
(Continued)

(58) Field of Classification Search
USPC .................................................. 307/9.1, 10.1
See application file for complete search history.

(56) References Cited

U.S. PATENT DOCUMENTS

| 2014/0084857 A1 | 3/2014 | Liu et al. |
| 2017/0040848 A1* | 2/2017 | Lannoije ............... B60L 53/124 |
| 2017/0054333 A1* | 2/2017 | Roehrl .................... G01V 3/101 |

FOREIGN PATENT DOCUMENTS

| DE | 202009009693 U1 | 11/2010 |
| DE | 102014205598 A1 | 10/2015 |

(Continued)

OTHER PUBLICATIONS

International Search Report with English translation and Written Opinion for Application No. PCT/EP2016/076381 dated Jan. 20, 2017 (14 pages).

*Primary Examiner* — Rexford N Barnie
*Assistant Examiner* — Xuan Ly
(74) *Attorney, Agent, or Firm* — Michael Best & Friedrich LLP

(57) ABSTRACT

The invention relates to a monitoring device for monitoring an inductive energy transmission device from at least one transmitting coil to at least one receiving coil spaced apart from the at least one transmitting coil. The monitoring device comprises a coil array, which has individual coils and is designed to monitor an intermediate space between the at least one transmitting coil and the at least one receiving coil. The individual coils can be individually controlled. The suitable control can be used for a variable detection height and can ensure reliable operation even if an individual coil fails.

5 Claims, 3 Drawing Sheets

(51) Int. Cl.
*H02J 50/60* (2016.01)
*H02J 7/00* (2006.01)
*B60L 53/12* (2019.01)
*B60L 53/124* (2019.01)

(52) U.S. Cl.
CPC ............ *H02J 7/0027* (2013.01); *H02J 50/40* (2016.02); *H02J 50/60* (2016.02); *Y02T 10/7005* (2013.01); *Y02T 10/7055* (2013.01); *Y02T 10/7072* (2013.01); *Y02T 90/122* (2013.01); *Y02T 90/14* (2013.01)

(56) References Cited

FOREIGN PATENT DOCUMENTS

| | | | |
|---|---|---|---|
| DE | 102014207885 A1 | 10/2015 | |
| JP | 2009271846 A | 11/2009 | |
| JP | 2010200497 A | 9/2010 | |
| JP | 2013218446 A | 10/2013 | |
| TW | 201349703 A | 12/2013 | |
| TW | 201543063 A | 11/2015 | |
| WO | 2013127445 A1 | 9/2013 | |
| WO | 2014095722 A2 | 6/2014 | |

* cited by examiner

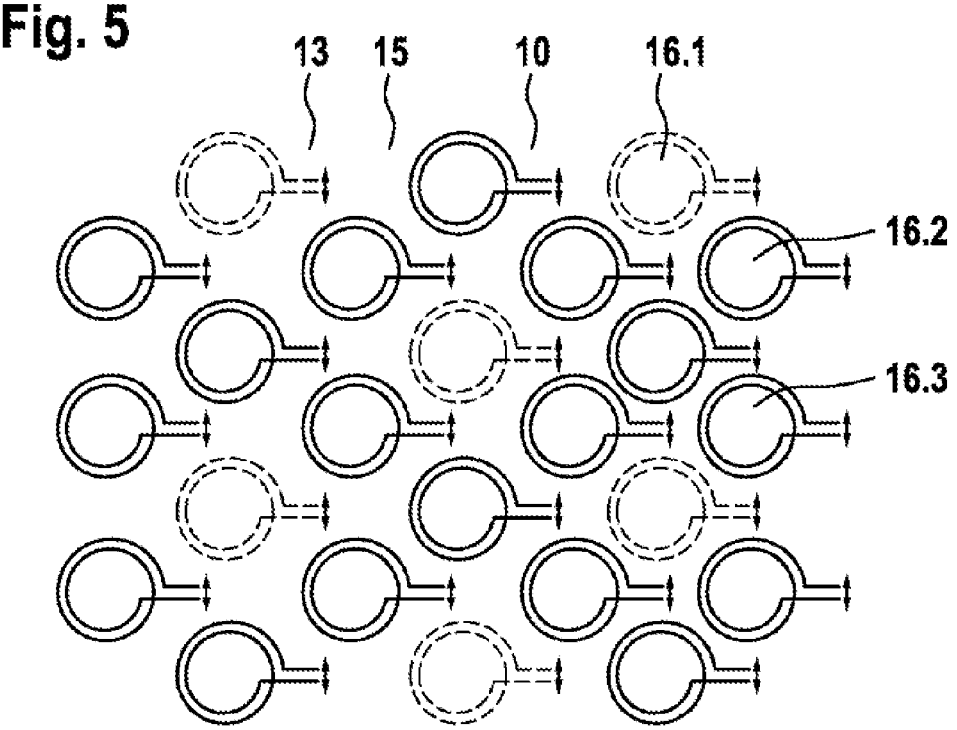
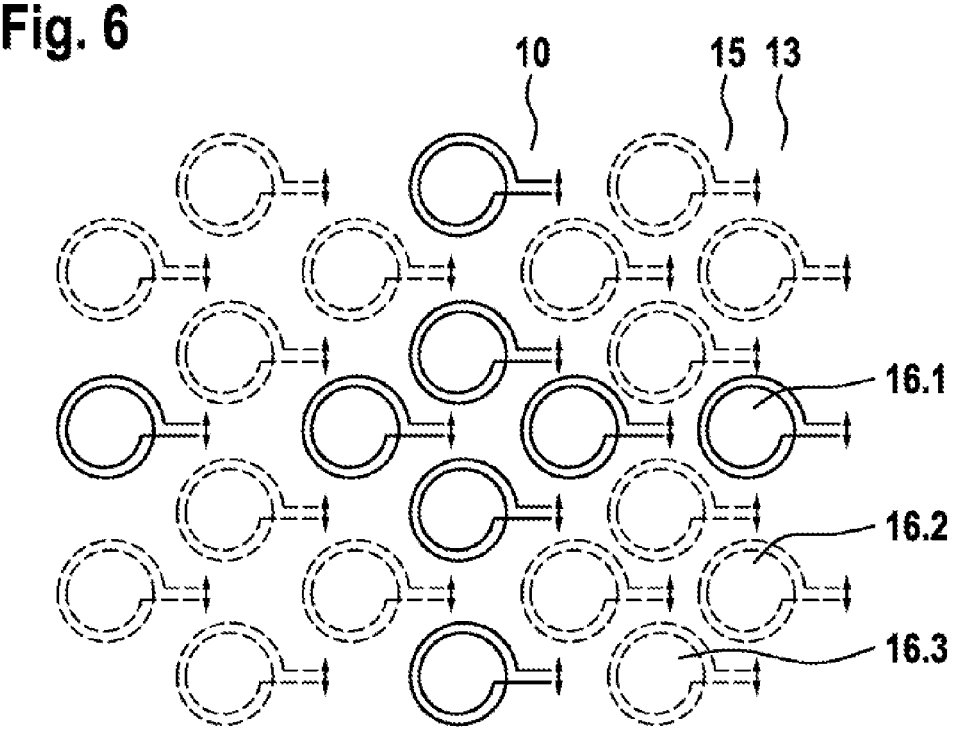

MONITORING DEVICE FOR MONITORING AN INDUCTIVE ENERGY TRANSMISSION DEVICE

BACKGROUND OF THE INVENTION

The present invention relates to a monitoring device for monitoring an inductive energy transmission device.

Electric vehicles and hybrid vehicles usually have an electric energy store, for example a traction battery, which makes electric energy available for the drive. If this electric energy store is wholly or partially discharged, the electric vehicle must drive to a charging station at which the energy store can be charged up again. It has been usual until now for this purpose that at such a charging station the electric vehicle is connected to the charging station by means of a cable connection. This connection must usually be established manually by a user. It is also required here that the charging station and the electric vehicle have a connecting system corresponding to one another.

A few cable-free charging systems for electric vehicles or hybrid vehicles are also known. An electric vehicle is parked for this purpose over a transmitting coil (transmitting device), or a charging pad or charging device. This coil transmits a high-frequency alternating magnetic field. The alternating magnetic field is received by a receiving coil (charging coil or receiving device) inside the vehicle and converted into electric energy. A traction battery of the vehicle can thereupon be charged by means of this electric energy. Document DE 10 2011 010 049 A1 discloses such a system for charging a vehicle battery in which the energy is transferred inductively.

The energy store of the electric vehicle can, furthermore, also be used for energy recovery. A cable connection or also an inductive energy or power transfer can also be used for this purpose.

For the cable-free charging of a battery of an electric vehicle, the transmitting coil of the transformer typically is either inset into the road surface or is formed as a charging plate (charging pad) placed on the ground, and is connected by means of a suitable electronic system to the electric grid. The receiving coil of the transformer is typically mounted permanently into the floor of the vehicle and for its part is connected by means of a suitable electronic system to the traction battery of the vehicle. For energy transfer, the transmitting coil or primary coil generates a high-frequency alternating field which penetrates the receiving coil or secondary coil where it induces a corresponding current. Since on the one hand the transmitted power scales up linearly with the switching frequency, and on the other hand the switching frequency is limited by the drive electronics and by losses in the transmission path, a typical frequency range of between 30 and 150 kHz results.

There is an air gap between the transmitting coil of the charging station and the receiving coil in the vehicle. Due to the ground clearance necessary for motor vehicles, this air gap amounts to a few centimeters. Air gaps with a size of between 3 and 30 cm are thus very widespread whenever an ideally small air gap is not achieved through measures such as lowering the coil that is fixed to the vehicle, the entire vehicle, or raising the locally fixed coil, or a combination of these measures. The alternating magnetic fields arising in the air gap during the transmission are capable of inducing electric eddy currents in any metal or electrically conductive objects that are located in the air gap. These so-called foreign objects heat up due to ohmic losses. This heating represents a significant danger, not only for personal safety, but also for the operational reliability of the vehicle. It is therefore necessary either to limit the heating of an inductive charging system by restricting the magnetic field, or to detect any objects that may be located in the air gap using suitable means and thereupon to deactivate the energy transfer until these are removed or until they no longer represent a danger.

Known methods for the detection of foreign objects consist, for example, in conventional inductive metal detection using additional sampling coils which are subjected to pulsed excitation and whose electrical decay behaviors are analyzed. A version of a coil array which detects the presence of the foreign objects using its own magnetic field by means of eddy current losses or through a shift in the coupling factor, or through the variation of the coil quality is particularly appropriate here. The diameter of the coil plays a crucial role here. The smaller the coil diameter, the more precise is the resolution of position, and the more possible it is for small objects (cent coins, paperclips, etc.) to be detected. It is disadvantageous that a fine-mesh array does not illuminate the whole of the intermediate space between the transmitting coil lying on/in the ground and the receiving/charging coil located in the vehicle. The reason for this is that the magnetic field of the sensor array/coil array only illuminates/detects approximately as high as the length of the diameter of the coil. A fine, close-mesh network/array thus does not detect any metal objects that are arranged high above the ground coil (an upright yoghurt container with aluminum lid, cigarette pack, metal bars that are poking in etc. for example).

There is therefore a need for a monitoring device for inductive energy transmission devices by means of which the detection height of the coil array used for detection can be made scalable without thereby changing the mechanical configuration of coils.

SUMMARY OF THE INVENTION

The device according to the invention has the advantages that the detection height of the monitoring device can be adjusted variably.

According to the invention it is provided for this purpose that the monitoring device for monitoring an inductive energy transmission device from at least one transmitting coil to at least one receiving coil spaced apart from the at least one transmitting coil, wherein the monitoring device comprises a coil array, has individual coils, and is designed to monitor an intermediate space between the at least one transmitting coil and the at least one receiving coil, wherein the individual coils can be individually controlled. It is advantageous that with a suitable design, the illumination height/detection height can be selected freely with the aid of a suitable energization of the individual array coils. It is furthermore advantageous that this type of detection is characterized by a high degree of insensitivity to the weather and a low dependency on the illumination of the region under the vehicle floor. The detection boundary can, moreover, be clearly limited to the region under the vehicle, which greatly reduces the rate of incorrect detections.

The individual coils are advantageously arranged in at least one layer in the densest hexagonal close packing (the densest circle packing for two dimensions). This has the advantage that the individual coils only touch one another, but do not overlap, while the remaining empty space is kept minimal. The array of the individual coils or detection coils advantageously consists of a honeycomb arrangement. A high local resolution with relatively low illumination height can be achieved if all the individual coils are energized in the same way. It can also be advantageous if the coils are energized in opposite directions.

It is furthermore advantageous if the individual coils of the coil array are interconnected such that if an individual coil fails, the remaining individual coils are so interconnected through partial switching on and off that they form symmetric meshes, or a symmetric, closed line of edges and nodes. This is advantageous, since the circuitry of the coil array is thus designed for fail-safety, so that in the event of the failure of one coil cell, patterns can still be operated that do not require the failed individual coil/coil. Differing coil patterns are advantageously possible here, provided a fault-free pattern arises even without the defective coil/individual coil.

Advantageously the individual coils are constructed as round or rounded or angular planar coils. The densest hexagonal close packing, or circle packing, can be most effectively ensured with this kind of coil construction.

It is furthermore advantageous that the monitoring device is operated under attenuation control. In operation under attenuation control, the attenuation of the coil array is used for the generation of the detection signal. It is also advantageous that a resonant mode of operation is possible, in which the inductance of the detection coil is excited into oscillation with resonance capacitors.

The monitoring device can be operated resonantly. In resonant operation, the coil array is driven with suitable circuitry at the resonant point, and the quality or the coupling of the resonant circuits is then chosen for the generation of the detection signal. The detection height and resolution can in this way advantageously be freely chosen through the different circuitry of the same coil array.

Further features and advantages of the present invention will be clear to the expert from the following description of exemplary forms of embodiment which, however, are not to be seen as restricting the invention, with reference to the appended drawings.

BRIEF DESCRIPTION OF THE DRAWINGS

FIG. 5: shows a further schematic illustration of the coil array with other operating parameters;
and
FIG. 6: shows a further schematic illustration of the coil array with other operating parameters.

DETAILED DESCRIPTION

All of the figures are merely schematic illustrations of devices according to the invention or of their components according to exemplary embodiments of the invention. Distances and relative sizes in particular are not reproduced to scale in the figures. Corresponding elements are given the same reference signs in the various figures.

Figure 1:
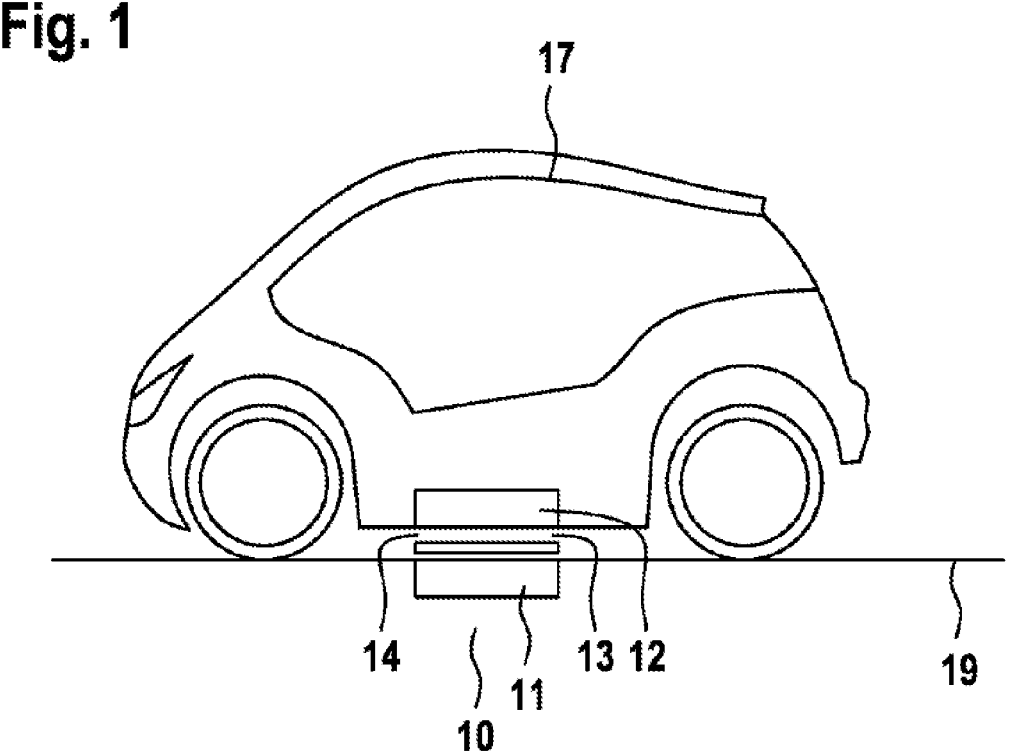
FIG. 1: shows a schematic illustration of a vehicle and an inductive energy transmission device.

FIG. 1 shows a schematic illustration of a vehicle 17, a device for inductive energy transmission 10 and a monitoring device 13. The vehicle/electric vehicle/hybrid vehicle 17 is stationary. The traction battery 18 (not illustrated here) is charged through the device for inductive energy transmission 10. A transmitting coil/transmitting device 11 is inset into the ground 19 or lies on the ground 19 for this purpose. The receiving coil/receiving device 12 is arranged in the vehicle 17—preferably in the floor of the vehicle 17. An intermediate space 14, also known as the air gap 14, is located between the transmitting coil 11 and the receiving coil 12. The monitoring device 13 is arranged in this intermediate space 14, and preferably lies on the transmitting coil 11. The monitoring device 13 comprises a coil array 15, which consists of individual coils 16.1, 16.2, . . . 16n. These individual coils 16.1, 16.2, . . . 16.n can be driven differently, and are preferably arranged with close hexagonal packing, i.e. in the densest circle packing in 2 dimensions. The coil array (array of detection coils) 15 is formed, for example, as a honeycomb arrangement of individual coils. Preferably the individual coils 16.1, 16.2, . . . 16.n are constructed as round, rounded or angular planar coils.

Figure 2:
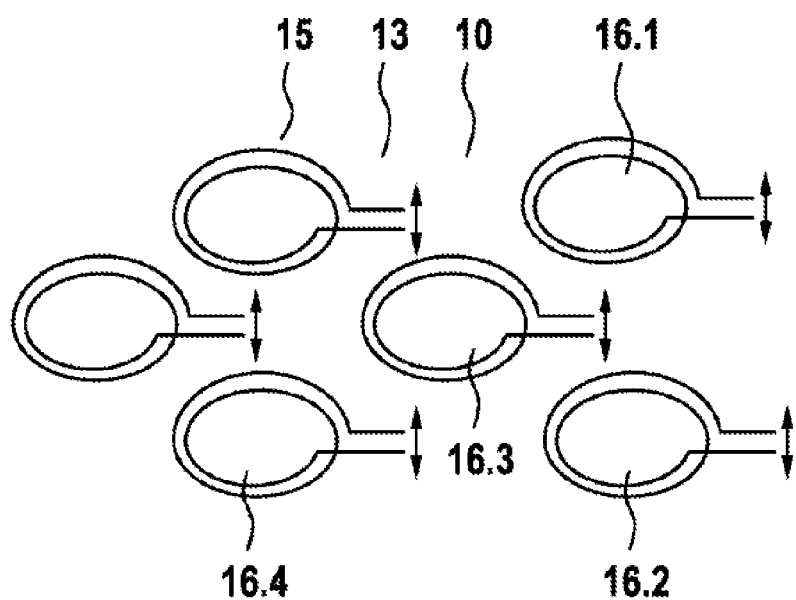
FIG. 2: shows a schematic illustration of a coil array.

FIG. 2 shows a schematic illustration of the coil array 15. The same elements as referenced in FIG. 1 are given the same reference signs, and are not explained in more detail. In this example of FIG. 2, all the individual coils 16.1, 16.2, . . . 16.n are energized equally, preferably symmetrically. The arrows in FIG. 2 indicate the energization, but not the direction of current flow. A high local resolution with a relatively low illumination height/detection height can be achieved through this. The number of windings of each of the individual coil elements 16.1-16.n can vary, and is optimized from the points of view of functional aspects and cost. In the extreme case, a coil element consists of only one conductive track loop. The interconnection of the coil array 15 is designed for fail-safety, so that in the event that a single coil/coil cell of the assembly of the individual coil 16.1 . . . 16.n fails, patterns can still be operated that no longer require the failed individual coil. Differing coil patterns are possible here, provided a fault-free pattern arises even without the defective single coil 16.x (x representing 1, 2, . . . n).

Figure 3:
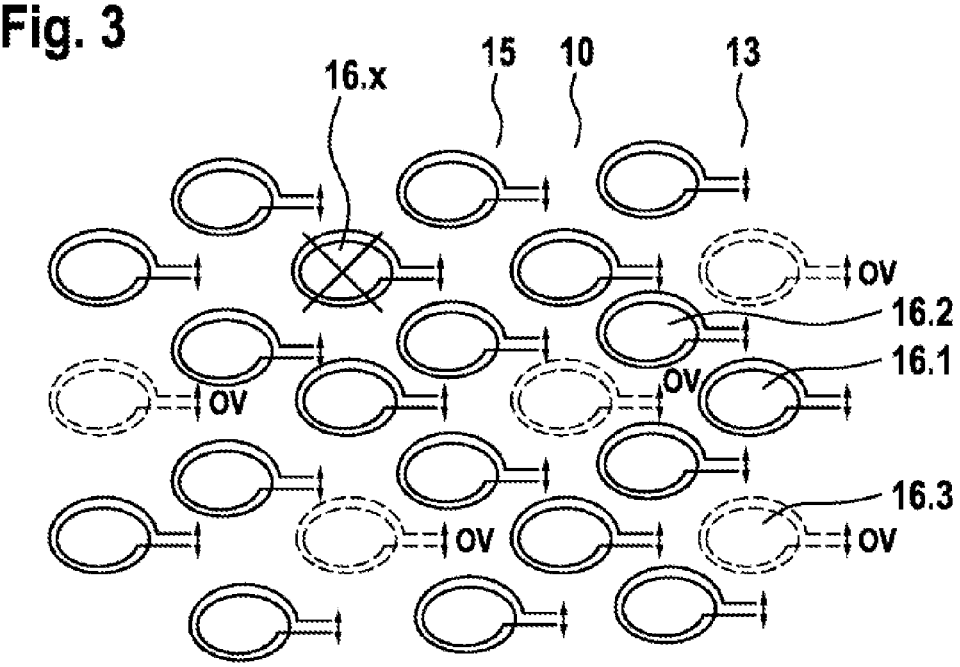
FIG. 3: shows a further schematic illustration of the coil array with other operating parameters.
Figure 4:
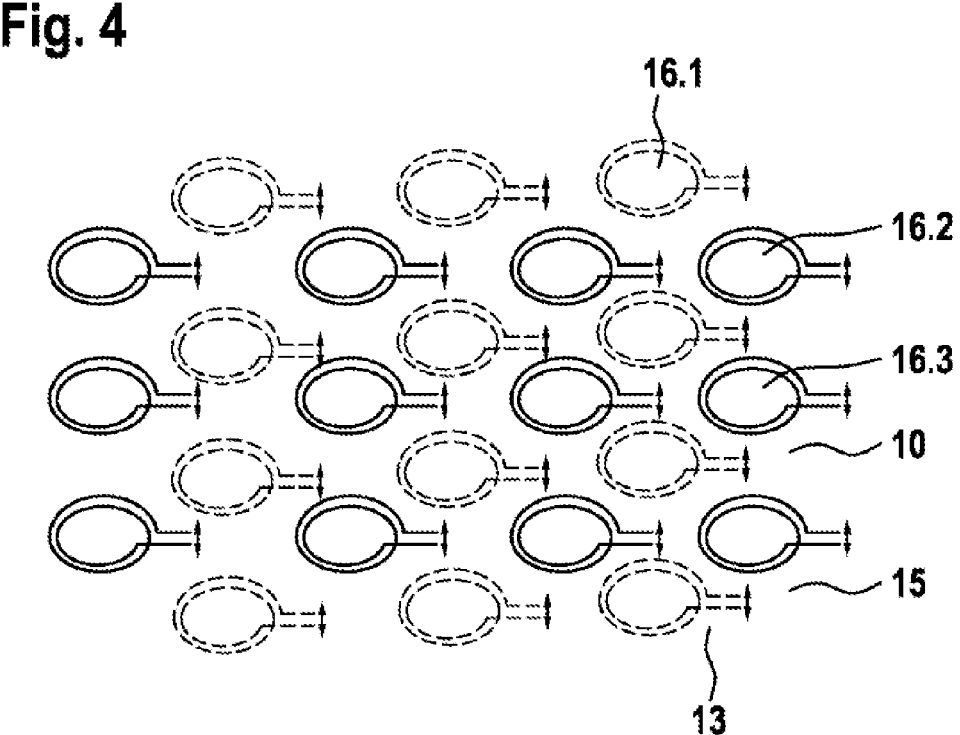
FIG. 4: shows a further schematic illustration of the coil array with other operating parameters.

FIG. 3 and FIG. 4 show further schematic illustrations of the coil array 15 according to FIG. 2. The same elements as referenced in FIG. 2 are given the same reference signs, and are not explained in more detail. In this exemplary embodiment, the single coil 16.x (struck through) has failed. The interconnection of the coil array 15 is designed for fail-safety, which has the result that in the event of the failure of this individual coil, patterns can be operated, in that further coils (shown with a dotted line) are switched off in such a way that patterns of high symmetry form from individual coils that are in operation. For example, the magnetically resulting meshes are enlarged to increase the range. Larger substructures form for this purpose, which also lead to a higher detection height. With suitable design, the illumination height/detection height can be chosen freely with the help of an adjusted energization of the individual array coils. The detection height, and with that the detectability of higher (floating) metal objects can also be increased with further patterns. In order to enable the most sensitive/precise detection, the entire coil array 15, consisting of individual coils 16.1 . . . 16.n can be operated both with attenuation control and resonantly. In operation under attenuation control, the attenuation of the coil array 15 is used for the generation of the detection signal. In resonant operation, the coil array 15 is driven with suitable circuitry at the resonant point, and the quality or the coupling of the resonant circuits is chosen for the generation of the detection signal. The detection height and resolution can in this way be freely chosen through the different circuitry of the same coil array 15. To detect different object sizes, the different energization types and geometric mesh patterns can also be connected and evaluated in sequence.

FIG. 5 and FIG. 6 show further schematic illustrations of the coil array 15 according to FIG. 2. The same elements as referenced in FIGS. 2-4 are given the same reference signs, and are not explained in more detail. To achieve an adequate symmetry of the magnetic field, the current magnitudes in the individual windings of the coil array 15 can also have different characteristics. Thus that coil type which, for example, is in a minority (shown with dotted lines in the figures) can be energized more strongly. It is also possible to energize only part of the coils, and thus to achieve a stronger concentration of current/magnetism in the individual coils. It is thus possible for only every second coil to be energized, in order thus to prevent a local obliteration of the magnetic field, or to increase the magnetic field strength of the remaining coils. In a further exemplary embodiment, the individual coils partially overlap. It is also conceivable that the grid of the coil array 15 also varies in relation to the center of the coil array. A closer mesh can thus be chosen in the center than at the edge, or vice versa.

What is claimed is:

1. A monitoring device (13) for monitoring a device (10) for inductive energy transmission from at least one transmitting coil (11) to at least one receiving coil (12) spaced apart from the at least one transmitting coil (11), wherein the monitoring device (13) comprises a coil array (15) which has individual coils (16.1, 16.2, . . . 16.n) and is configured to monitor an intermediate space (14) between the at least one transmitting coil (11) and the at least one receiving coil (12), characterized in that the individual coils (16.1, 16.2, . . . 16.n) are configured to be driven individually, such that a detection height can thus be variably adjusted, wherein the individual coils (16.1, 16.2, . . . 16.n) of the coil array (15) are interconnected in such a way that in the event that an individual coil fails, the remaining individual coils (16.1, 16.2, . . . 16.n) are so interconnected through partial switching on and off that the remaining coils form symmetric meshes, or a symmetric, closed line of edges and nodes.

2. The monitoring device (13) as claimed in claim 1, characterized in that the individual coils (16.1, 16.2, . . . 16.n) are arranged in a densest hexagonal close packing.

3. The monitoring device (13) as claimed in claim 1, characterized in that the individual coils (16.1, 16.2, . . . 16.n) are constructed as rounded or angular planar coils.

4. The monitoring device (13) as claimed in claim 1, further comprising means for operating the monitoring device (13) under attenuation control.

5. The monitoring device (13) as claimed in claim 1, further comprising means for operating the monitoring device resonantly.

* * * * *